(12) United States Patent
Natarajan et al.

(10) Patent No.: US 11,956,711 B2
(45) Date of Patent: Apr. 9, 2024

(54) ACCESS POINT WITH LIMITED FLASH MEMORY

(71) Applicant: QUALCOMM Incorporated, San Diego, CA (US)

(72) Inventors: Sreekanth Natarajan, Chennai (IN); Vairamuthu Karuppiah, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 17/139,108

(22) Filed: Dec. 31, 2020

(65) Prior Publication Data

US 2022/0210723 A1 Jun. 30, 2022

(51) Int. Cl.
*H04W 48/16* (2009.01)
*H04W 76/10* (2018.01)
*H04W 84/12* (2009.01)

(52) U.S. Cl.
CPC .......... *H04W 48/16* (2013.01); *H04W 76/10* (2018.02); *H04W 84/12* (2013.01)

(58) Field of Classification Search
CPC ... H04W 84/18; H04W 40/248; H04W 24/02; H04W 24/04; H04W 24/00; H04W 76/10; H04W 8/24; H04W 84/22; H04W 88/12; H04W 88/08; H04W 28/14; H04W 52/028; H04W 72/0406; H04W 88/06; H04W 84/12; H04W 16/18; H04W 48/20; H04W 48/16
See application file for complete search history.

(56) References Cited

U.S. PATENT DOCUMENTS

| | | | | |
|---|---|---|---|---|
| 6,772,159 B1* | 8/2004 | Blount | ................... | G06F 16/27 |
| 11,080,040 B1* | 8/2021 | Devaraj | .................. | H04L 67/34 |
| 2005/0060390 A1* | 3/2005 | Vakil | .................. | H04L 61/5007 |
| | | | | 709/220 |
| 2007/0171909 A1* | 7/2007 | Pignatelli | ................ | H04L 47/12 |
| | | | | 370/395.21 |
| 2015/0085745 A1* | 3/2015 | Atreya | .................. | H04W 16/18 |
| | | | | 370/328 |
| 2017/0350987 A1* | 12/2017 | Morford | ................. | G01S 19/51 |
| 2018/0041404 A1* | 2/2018 | Singh | ...................... | G06F 9/542 |
| 2018/0255175 A1* | 9/2018 | Tran | ...................... | H04W 8/245 |

OTHER PUBLICATIONS

Cisco IR800 Integrated Services Router Software Configuration Guide by CISCO, dated May 26, 2017 (Year: 2017).*
"Support 101—Where do I begin?" by US Robotics, archived on Apr. 25, 2017 (Year: 2017).*
SVROPS: "Cisco Router Boot Sequence," Mar. 31, 2020, pp. 1-2, Retrieved from Internet: https://www.svrops.com/svrops/documents/ciscoboot.htm.

* cited by examiner

Primary Examiner — Raymond S Dean
(74) Attorney, Agent, or Firm — Patterson+ Sheridan, L.L.P.

(57) ABSTRACT

Certain aspects of the present disclosure provide techniques for an access point (AP) that does not use a flash memory for some storage (e.g., storing software images, logs, data, and other content used or generated by the AP) and file system operations (e.g., reading and writing dynamic files used by the AP). A method that may be performed, by an AP having a limited amount of flash memory, includes downloading a system image from a network entity, other than the AP, via a wireless network connection; and providing wireless local area network (WLAN) AP services using the downloaded system image.

19 Claims, 4 Drawing Sheets

ACCESS POINT WITH LIMITED FLASH MEMORY

BACKGROUND

Field of the Disclosure

Aspects of the present disclosure relate to wireless communications, and more particularly, to techniques for providing an access point (AP) that does not use a flash memory for some storage and file system operations.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include IEEE 802.11 systems, 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

However, as the demand for mobile broadband access continues to increase, there exists a need for further improvements in devices providing IEEE 802.11 network access. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include reductions in cost of access points (APs) and improvements in reliability and security of APs.

Certain aspects provide a method for wireless communication performed by an access point (AP) having a limited amount of flash memory. The method generally includes downloading a system image from a network entity, other than the AP, via a wireless network connection and providing wireless local area network (WLAN) AP services using the downloaded system image.

Certain aspects of the present disclosure are directed to an access point (AP) for wireless communication. The AP generally includes a processor; a flash memory coupled with the processor and including first instructions to cause the processor to download a system image from a network entity, other than the AP, via a wireless network connection, wherein the processor is configured to execute the first instructions and to provide wireless local area network (WLAN) AP services using the downloaded system image; and a non-flash memory coupled with the processor and configured to store the downloaded system image.

Certain aspects of the present disclosure are directed to an apparatus for wireless communication. The apparatus generally includes means for downloading a system image from a network entity, other than the apparatus, via a wireless network connection and means for providing wireless local area network (WLAN) access point (AP) services using the downloaded system image.

Certain aspects of the present disclosure are directed to a computer-readable medium having instructions stored thereon that, when executed by a processing system of an access point (AP), cause the processing system to perform operations including: downloading a system image from a network entity, other than the AP, via a wireless network connection; and providing wireless local area network (WLAN) AP services using the downloaded system image.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide techniques and apparatus involving an access point (AP) that does not use a flash memory for some storage and file system operations and thus has much smaller flash memory than previously known APs. A significant cost reduction for APs and other gateways (collectively "APs") may be realized by reducing the amount of flash memory used in the APs by not using the flash memory for some storage (e.g., storing software images, logs, data, and other content used or generated by the APs) and file system operations (e.g., reading and writing dynamic files used or generated by the AP). Aspects of the present disclosure provide an AP that has a limited flash memory (e.g., less than 1 MB) that is used by the system to boot and perform basic operations. According to aspects of the present disclosure, such an AP may access storage in a remote location, e.g., at a network system controller. Such an AP may use other storage media, cheaper than flash memory, for file system operations, such as for reading and writing dynamic (e.g., buffer or swap) files that the AP uses while operating.

The following description provides examples of an access point (AP) that does not use a flash memory for certain storage and file system operations, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a WI-FI™ RAT network may be deployed.

Figure 1:
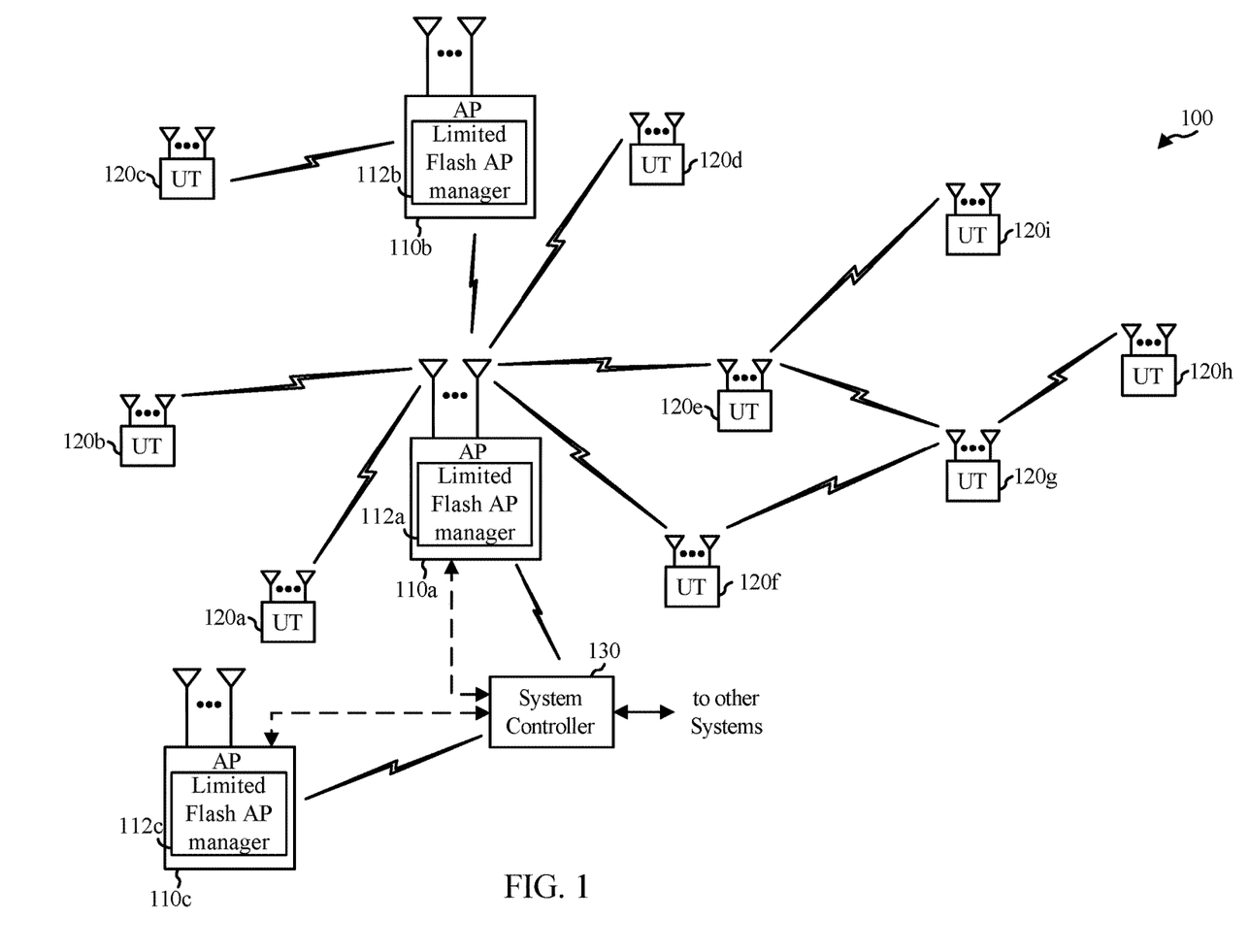
FIG. 1 is a diagram of an example wireless communications network, in which certain aspects of the present disclosure may be practiced.

FIG. 1 illustrates a wireless communications system 100 with access points 110, user terminals 120, and a system controller 130, in which aspects of the present disclosure may be practiced. For simplicity, three access points 110a, 110b, and 110c are shown in FIG. 1. An access point (AP) is generally a fixed station that communicates with the user terminals and may also be referred to as a base station (BS), an evolved Node B (eNB), or some other terminology. A user terminal (UT) may be fixed or mobile and may also be referred to as a mobile station (MS), an access terminal, user equipment (UE), a station (STA), a client, a wireless device, or some other terminology. A user terminal may be a wireless device, such as a cellular phone, a personal digital assistant (PDA), a handheld device, a wireless modem, a laptop computer, a tablet, a personal computer, etc. A system controller generally refers to a network entity that may provide configurations to APs, control access to other networks (e.g., the Internet), and/or store data generated by the APs.

An access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. The system controller 130 couples to and provides coordination and control for the access points.

Wireless communications system 100 employs multiple transmit and multiple receive antennas for data transmission on the downlink and uplink. Access point 110 may be equipped with a number $N_{ap}$ of antennas to achieve transmit diversity for downlink transmissions and/or receive diversity for uplink transmissions. A set $N_u$ of selected user terminals 120 may receive downlink transmissions and transmit uplink transmissions. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

Wireless communications system 100 may be a time division duplex (TDD) system or a frequency division duplex (FDD) system. For a TDD system, the downlink and uplink share the same frequency band. For an FDD system, the downlink and uplink use different frequency bands. Wireless communications system 100 may also utilize a single carrier or multiple carriers for transmission. Each user terminal 120 may be equipped with a single antenna (e.g., to keep costs down) or multiple antennas (e.g., where the additional cost can be supported).

According to certain aspects, the APs 110 may be configured to not use a flash memory for certain storage and file system operations and thus have smaller flash memory (e.g., ≤1 MB) than previously known APs. As shown in FIG. 1, the APs 110 include a limited flash AP manager 112. The limited flash AP manager 112 may be configured to download a system image from a network entity, other than the AP, via a wireless network connection; and to provide wireless local area network (WLAN) AP services using the downloaded system image, in accordance with aspects of the present disclosure. The AP may download the system image from the system controller 130 or from another AP 110.

Figure 2:
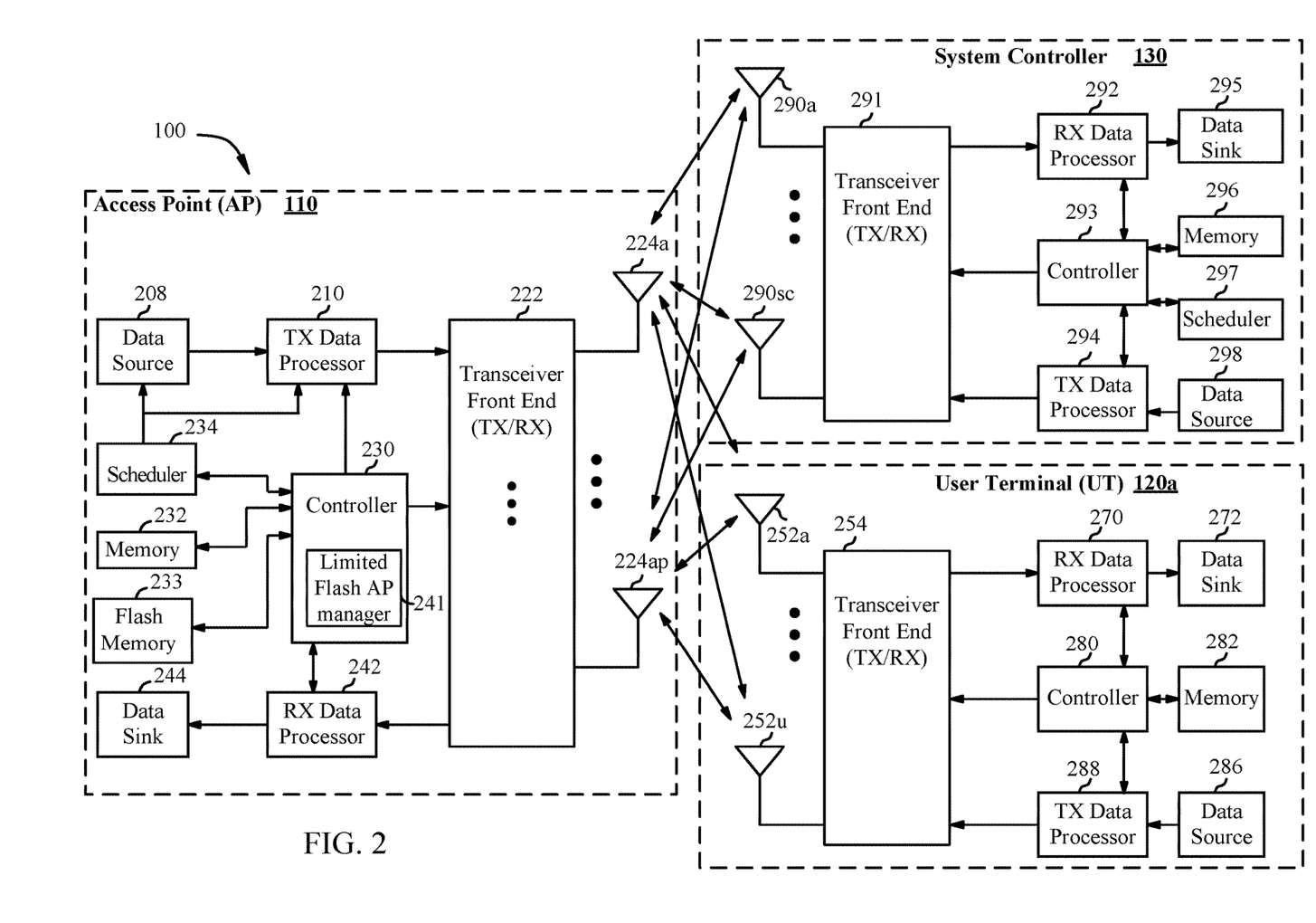
FIG. 2 is a block diagram of an example system controller, example access points (APs), and example user terminals, in which certain aspects of the present disclosure may be practiced.

FIG. 2 shows a block diagram of system controller 130, access point 110, and a user terminal 120a in the wireless communications system 100. Access point 110 is equipped with $N_{ap}$ antennas 224a through 224ap. User terminal 120a is equipped with $N_{ut,m}$ antennas 252a through 252u, and system controller 130 is equipped with $N_{sc}$ antennas 290a through 290sc. Access point 110 is a transmitting entity for the downlink and a receiving entity for the uplink. Access point 110 is also a receiving entity for downloading a system image from system controller 130. System controller 130 is a transmitting entity for downloading a system image to the access point 110. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. Beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up}\}$ for the user terminal based on the coding and modulation schemes associated with the rate selected for the user terminal and provides a data symbol stream $\{s_{up}\}$ for one of the $N_{ut,m}$ antennas. In one aspect, TX data processor 288 is a digital signal processor (DSP) that can be configured to implement one or more techniques described herein. A transceiver front end (TX/RX) 254 (also known as a radio frequency front end (RFFE)) receives and processes (e.g., converts to analog, amplifies, filters, and frequency upconverts) a respective symbol stream to generate an uplink signal. The transceiver front end 254 may also route the uplink signal to one of the $N_{ut,m}$ antennas for transmit diversity via an RF switch, for example. The controller 280 may control the routing within the transceiver front end 254. Memory 282 may store data and program codes for the user terminal 120 and may interface with the controller 280.

A number $N_{up}$ of user terminals 120 may be scheduled for simultaneous transmission on the uplink. Each of these user terminals transmits its set of processed symbol streams on the uplink to the access point.

At access point 110, $N_{ap}$ antennas 224a through 224ap may receive signals conveying a downloaded system image from system controller 130. The $N_{ap}$ antennas 224a through 224ap may also receive the uplink signals from all $N_{up}$ user terminals transmitting on the uplink. For receive diversity, a transceiver front end 222 may select signals received from one of the antennas 224 for processing. The signals received from multiple antennas 224 may be combined for enhanced receive diversity. The access point's transceiver front end 222 also performs processing complementary to that performed by the user terminal's transceiver front end 254 and provides a recovered uplink data symbol stream. The recovered uplink data symbol stream is an estimate of a data symbol stream $\{s_{up}\}$ transmitted by a user terminal. An RX data processor 242 processes (e.g., demodulates, deinterleaves, and decodes) the recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 may provide a downlink data symbol streams for one of more of the $N_{dn}$ user terminals to be transmitted from one of the $N_{ap}$ antennas. In one aspect, TX data processor 210 is a DSP that can be configured to implement one or more techniques described herein. The transceiver front end 222 receives and processes (e.g., converts to analog, amplifies, filters, and frequency upconverts) the symbol stream to generate a downlink signal. The transceiver front end 222 may also route the downlink signal to one or more of the $N_{ap}$ antennas 224 for transmit diversity via an RF switch, for example. The controller 230 may control the routing within the transceiver front end 222. Memory 232 may store data and program codes for the access point 110 and may interface with the controller 230. The TX data processor 210 receives AP data from a data source 208 for transmission to the system controller, control data from a controller 230, and possibly other data from a scheduler 234. The various types of data may be sent on different transport channels. TX data processor 210 processes (e.g., encodes, interleaves, and modulates) the AP data based on the rate selected for transmission to the system controller. TX data processor 210 may provide an AP data symbol stream to be transmitted from one of the $N_{ap}$ antennas. In one aspect, TX data processor 210 is a DSP that can be configured to implement one or more techniques described herein. The transceiver front end 222 receives and processes (e.g., converts to analog, amplifies, filters, and frequency upconverts) the AP data symbol stream to generate a signal for transmission to the system controller. The transceiver front end 222 may also route the AP data signal to one or more of the $N_{ap}$ antennas 224 for transmit diversity via an RF switch, for example. The controller 230 may control the routing within the transceiver front end 222. Memory 232 may store data and a downloaded system image for the access point 110 and may interface with the controller 230. Flash memory 233 may store instructions for activating the AP and downloading a system image. Flash memory 233 may also interface with the controller 230.

At system controller 130, $N_{sc}$ antennas 290a through 290sc may receive signals conveying AP data from AP 110. The $N_{sc}$ antennas 290a through 290sc may also receive acknowledgment (ACK) signals from the AP 110. For receive diversity, a transceiver front end 291 may select signals received from one of the antennas 290 for processing. The signals received from multiple antennas 290 may be combined for enhanced receive diversity. The system controller's transceiver front end 291 also performs processing complementary to that performed by the AP's transceiver front end 222 and provides a recovered AP data symbol stream. The recovered AP data symbol stream is an estimate of a data symbol stream $\{s_{ap}\}$ transmitted by an AP. An RX data processor 292 processes (e.g., demodulates, deinterleaves, and decodes) the recovered AP data symbol stream in accordance with the rate used for that stream to obtain decoded AP data. The decoded AP data for each AP may be provided to a data sink 295 for storage and/or a controller 293 for further processing.

Also at system controller 130, a TX data processor 294 receives a system image from a data source 298 for transmission to the AP, control data from a controller 293 and possibly other data from a scheduler 297. The various types of data may be sent on different transport channels. TX data processor 294 processes (e.g., encodes, interleaves, and modulates) the system image for transmission to the AP based on a rate selected for the AP. TX data processor 294 may provide a system image data symbol stream for the AP to be transmitted from one or more of the $N_{sc}$ antennas. In one aspect, TX data processor 294 is a DSP that can be configured to implement one or more techniques described herein. The transceiver front end 291 receives and processes (e.g., converts to analog, amplifies, filters, and frequency upconverts) the system image data symbol stream to generate a signal to the AP. The transceiver front end 291 may also route the signal to one or more of the $N_{sc}$ antennas 290 for transmit diversity via an RF switch, for example. The controller 293 may control the routing within the transceiver front end 291.

At each user terminal 120, $N_{ut,m}$ antennas 252 receive the downlink signals from access point 110. For receive diversity at the user terminal 120, the transceiver front end 254 may select signals received from one of the antennas 252 for processing. The signals received from multiple antennas 252 may be combined for enhanced receive diversity. The user terminal's transceiver front end 254 also performs processing complementary to that performed by the access point's transceiver front end 222 and provides a recovered downlink data symbol stream. An RX data processor 270 processes (e.g., demodulates, deinterleaves, and decodes) the recovered downlink data symbol stream to obtain decoded data for the user terminal.

The controller/processor 230 and/or other processors or modules at the AP 110 may perform or direct the execution of processes for the techniques described herein. For example, as shown in FIG. 2, the controller/processor 230 of the AP 110 has a limited flash AP manager 241 that may be configured for downloading a system image from a network entity, other than the AP, via a wireless network connection; and for providing wireless local area network (WLAN) AP services using the downloaded system image, according to aspects described herein. Although shown at the controller/processor, other components of the AP 110a may be used to perform the operations described herein.

According to aspects of the present disclosure, a significant cost reduction for APs may be realized by reducing the amount of flash memory used in the APs by not using the flash memory to, for example, store software images, logs, data, and/or other content used or generated by the APs. APs may also reduce the amount of flash memory used in the APs by not using the flash memory for file system operations, such as for reading and writing dynamic (e.g., buffer or swap) files that the AP uses while operating.

In aspects of the present disclosure, reducing the amount of flash memory used in an AP may protect the AP from intrusion and corruption of the flash memory, such as overwriting the flash memory or downloading unauthorized software images to the flash memory.

According to aspects of the present disclosure, reducing the amount of flash memory used in APs may reduce manufacturing costs by avoiding installation of country-specific software in the flash memory of the APs.

Accordingly, it is desirable to develop techniques and apparatus for an access point (AP) that uses a limited flash memory configured to support only certain features of the AP.

Example Access Point with Limited Flash Memory

Aspects of the present disclosure provide techniques and apparatus for an access point (AP) (e.g., AP 110) that does not use a flash memory (e.g., flash memory 233) for some storage and file system operations (e.g., storing software images, logs, data, dynamic files, and other content used or generated by the AP). In aspects of the present disclosure, an AP is provided that does not use flash memory except for very basic operation of the AP, e.g., powering-up and downloading a system image (e.g., a configuration and set of instructions) for the AP to execute. Such an AP may use less than 1 MB of flash memory.

According to aspects of the present disclosure, an AP is provided that accesses storage media (e.g., a disk drive) at a remote location (e.g., at a system controller) for storage demands of the AP (e.g., storing log files and error messages). Such an AP may use other storage media, cheaper than flash memory, for file system operations, such as for reading and writing dynamic (e.g., buffer or swap) files that the AP uses while operating.

In aspects of the present disclosure, an AP is provided that may download a system image from another AP (e.g., via WI-FI™) that downloaded the system image from yet another AP or a system controller. Thus, in such aspects a WI-FI™ network may be configured in a distributed manner using a small WI-FI™ driver at each of the APs. Such an AP may use connectivity available between the AP and a remote location (e.g., cloud-based storage) via a WAN interface. For example, an AP may access cloud-based storage that may be managed by an original equipment manufacturer (OEM) for retail customers, by a wireless network provider to homeowners or businesses, and/or by an enterprise for the enterprise's use.

According to aspects of the present disclosure, the software in the local flash memory of an AP may be capable of booting all interfaces of the AP, providing LAN connectivity, providing WAN connectivity, providing basic WI-FI™ connectivity, and/or providing Bluetooth™ connectivity.

In aspects of the present disclosure, the software in the local flash memory of an AP may bring the AP to a state, S0, which may have limited capabilities. Those capabilities may include having WAN (e.g., via Ethernet) connectivity via a network to a remote location storing a system image for the AP. The S0 state capabilities may also include activating interfaces of the AP, getting an Internet protocol (IP) address, communicating via the network, downloading the system image(s) from the network, and performing diagnostics of the AP while in the S0 state.

In aspects of the present disclosure, software bringing an AP to the S0 state may include boot software, security and trust software, low footprint WI-FI™ software, diagnostics and logging software, Bluetooth™ software, a carrier software agent, and an OEM software agent.

According to aspects of the present disclosure, S0 state boot software may boot the AP and peripherals (if any), enable Ethernet interfaces of the AP, support dynamic host configuration protocol (DHCP) support to enable TCP/IP communications through the AP, and support file transfer protocol (FTP) or trivial file transfer protocol (TFTP) clients to enable them to download a system image for the AP.

In aspects of the present disclosure, S0 state security and trust software may support firmware over-the-air (FOTA) activity for secure download of a system image and authentication of the image. The S0 state security and trust software may verify software or firmware signatures to validate authenticity of the software or firmware. The S0 state security and trust software may also protect the AP from unauthorized access and download of images while the AP is in state S0 and S1.

According to aspects of the present disclosure, S0 state low footprint WI-FI™ software may enable a 2.4 GHz radio of the AP for a limited number of clients, associate the AP with trusted repeaters based on access filters, and download the system image over WI-FI™ from a system controller (e.g., a central AP or root AP).

In aspects of the present disclosure, S0 state diagnostics and logging software may track progress of download of a system image and track the activities of the AP during activation of the system image. The S0 state diagnostics and logging software may also troubleshoot activation of the system image and download and provide guidance for recovery if and when the AP fails.

According to aspects of the present disclosure, S0 state Bluetooth™ software may include firmware for connecting a mobile device (e.g., a mobile phone) via Bluetooth™ to configure the AP with credentials for network connectivity and may manage diagnostics functions available in States S0 and S1 for troubleshooting of the AP.

In aspects of the present disclosure, an S0 state carrier software agent may upgrade functions of the AP, including upgrading the client to support download of a software image. The S0 state carrier software agent may include remote diagnostics functions that may be integrated with diagnostics of the system image.

According to aspects of the present disclosure, an S0 state OEM software agent may upgrade functions of the AP, including upgrading the client to support download of a software image. The S0 state OEM software agent may include remote diagnostics functions that may be integrated with diagnostics of the system image.

In aspects of the present disclosure, the software in the local flash memory of an AP may have a tiny WI-FI™ driver that may bring the system to a state, S1, which may have limited capabilities including WI-FI™ connectivity. The WI-FI™ connectivity of the S1 state may be used for distributed networks to download a system image via a WI-FI™ backhaul and supply that system image to other APs using a WI-FI™ backhaul.

According to aspects of the present disclosure, an AP that has downloaded and implemented a system image may provide full AP functionality and may be considered to be in a state S2.

In aspects of the present disclosure, a system image and other files used by an AP (except the ones that are involved in bringing the AP to state S0 and/or S1) may be maintained in a central location and downloaded directly to random-access memory (RAM) of the AP during the initialization process of the AP.

According to aspects of the present disclosure, the limited flash memory of the AP may also store critical information for basic functioning of the AP, such as radio calibration information.

In aspects of the present disclosure, in an enterprise implementation of an AP, all software images for APs are stored in an enterprise controller. In the enterprise, enterprise access points may be connected to the enterprise controller via Ethernet or WI-FI™.

According to aspects of the present disclosure, software upgrades for APs in an enterprise implementation may be performed in the enterprise controller, which in turn is responsible for upgrading the APs. For example, when an AP restarts (e.g., a cold restart due to a power cycle), a device agent (e.g., in flash memory) of the AP communicates with the enterprise controller to download a software image. The version of the system image is consistent in various APs of the enterprise, as the enterprise defines the content of the system image.

In aspects of the present disclosure, a standard upgrade process for an enterprise may include upgrading a system image on the enterprise controller and the controller initiating a restart on all APs, so that the APs get the new software.

According to aspects of the present disclosure, in an enterprise implementation, all logging by APs may be migrated to remote logging on a central network entity (e.g., the enterprise controller), and there are no local logs on APs except critical logs.

In aspects of the present disclosure, in a wireless network provider implementation, a system image may be stored in cloud storage of the wireless network provider. Additionally or alternatively, wireless network providers who have fixed gateways (e.g. cable modems, xDSL gateways, or other forms of gateways that terminate the access network) can choose to deliver the system image to those fixed gateways and use the fixed gateways as the remote location for storing the system image and logs of the APs.

According to aspects of the present disclosure, in a wireless network provider implementation, system image upgrades may be performed in cloud storage of the wireless network provider or in access gateways. The version of the system image is consistent in various APs of the wireless network provider, as the wireless network provider defines the content of the system image.

In aspects of the present disclosure, in a wireless network provider implementation, when an AP restarts (e.g., a cold restart due to a power cycle), an agent stored in the flash memory of the AP communicates with cloud storage of the wireless network provider to secure download the system image securely using carrier secure protocols and agents (e.g., a Technical Report 069 (TR-069) agent).

According to aspects of the present disclosure, in a wireless network provider mesh network implementation, the system image may be downloaded to repeaters via WI-FI™. In such aspects, software supporting the S1 state may perform these upgrades. In such aspects, portions of the AP configuration that can vary from the system image may be backed up by the wireless network provider either locally or in cloud storage and restored once the new system image is downloaded.

Aspects of the present disclosure may provide a secure mechanism for software upgrades and ease of maintenance of software versions across a subscriber base of the wireless network provider, in a wireless network provider implementation. In these aspects, the wireless network provider may back up a configuration of an AP and restore the configuration on every cold reboot of the AP.

In aspects of the present disclosure, in a wireless network provider implementation, all logs of APs may be collected in cloud storage of the wireless network provider for diagnostics and regular tracking.

According to aspects of the present disclosure, in a wireless network provider network implementation, the provider can define subscription packages based on software profiles and upgrade the software package(s) to new software seamlessly from the cloud In aspects of the present disclosure, an OEM may store all system images for APs in a cloud storage facility for the OEM. In such aspects, the OEM may store the system images for single APs or for APs in distributed WI-FI™ applications.

Additionally or alternatively, according to aspects of the present disclosure, an OEM that provides a mesh implementation (e.g., a 2 or 3-pack solution) may provide for additional flash memory in the gateway (e.g., in one device in the pack) and use that gateway as the remote location for the other APs in the mesh implementation.

According to aspects of the present disclosure, an OEM may upgrade system images in the OEM cloud or on the designated gateway devices that have the additional flash memory.

In OEM-provided mesh implementations, when an AP restarts (e.g., a cold restart due to a power cycle), an agent in the flash memory of the AP communicates with the OEM cloud or the local gateway to download the system image.

According to aspects of the present disclosure, in an OEM-provided mesh implementation, if the gateway with the additional flash memory restarts, the gateway can communicate to the OEM cloud to download a system image or use the locally stored system image, based on a preference that may be set by the OEM and/or by an owner of the gateway.

In aspects of the present disclosure, in an OEM-provided mesh implementation, the system image may be downloaded to repeaters over WI-FI™. In such aspects, software supporting the S1 state may perform these upgrades. In such aspects, portions of the AP configuration that can vary from the system image may be backed up by the OEM either locally or in cloud storage and restored once the new system image is downloaded.

Aspects of the present disclosure may provide a secure mechanism for software upgrades and ease of maintenance of software versions across a subscriber base of an OEM. In these aspects, the OEM may back up a configuration of an AP and restore the configuration on every cold reboot of the AP.

According to aspects of the present disclosure, in an OEM-provided implementation, boot-up time for access points may increase based on connection bandwidth and cloud storage efficiency. If a system image is stored in designated gateways, then the boot-up time may not increase as much.

In aspects of the present disclosure, in an OEM-provided implementation, all logs of APs may be collected in cloud storage of the OEM for diagnostics and regular tracking.

Figure 3:
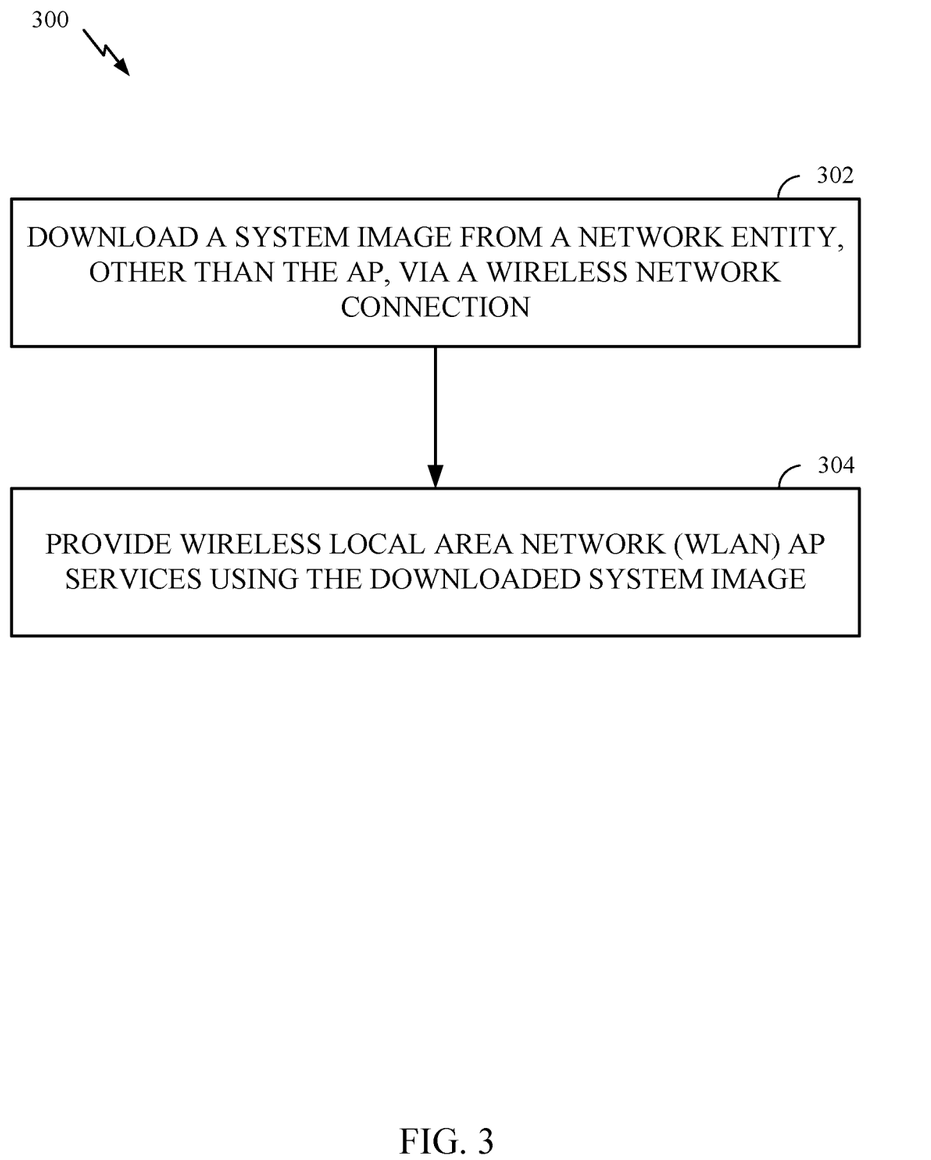
FIG. 3 is a flow diagram illustrating example operations for wireless communication by an AP, in accordance with certain aspects of the present disclosure.

FIG. 3 is a flow diagram illustrating example operations 300 for wireless communication, in accordance with certain aspects of the present disclosure. The operations 300 may be performed, for example, by an AP (e.g., the AP 110a in the wireless communication network 100). Operations 300 may be implemented as software components that are executed and run on one or more processors (e.g., controller/processor 230 of FIG. 2). Further, the transmission and reception of signals by the AP in operations 300 may be enabled, for example, by one or more antennas (e.g., antennas 224 of FIG. 2). In certain aspects, the transmission and/or reception of signals by the AP may be implemented via a bus interface of one or more processors (e.g., controller/processor 230) obtaining and/or outputting signals.

The operations 300 may begin, at block 302, by the AP downloading a system image from a network entity, other than the AP, via a wireless network connection.

At block 304, operations 300 continue with the AP providing wireless local area network (WLAN) AP services using the downloaded system image.

In some aspects of the present disclosure, the AP performing operations 300 has 1 megabyte (MB) or less of flash memory.

According to certain aspects of the present disclosure, operations 300 may include powering-up the AP and executing instructions, stored in the flash memory, to boot at least one network interface of the AP, to provide local area network (LAN) connectivity, and to provide wide area network (WAN) connectivity. In this case, executing the instructions does not provide the WLAN AP services of block 304.

In aspects of the present disclosure, operations 300 may include activating a wireless interface of the AP using a driver stored in the flash memory and establishing the wireless network connection via the wireless interface.

According to certain aspects of the present disclosure, operations 300 may include selecting the system image (to be downloaded in block 302) from a plurality of system images, based on a country of the AP. In some such aspects, selecting the system image may be further based on a country code assigned to the AP.

In aspects of the present disclosure, providing the WLAN AP services as in block 304 may include providing the WLAN AP services to a user terminal (UT), and the operations 300 may include: determining, based on user subscription information for an application on the UT, to download a software package for the application; downloading the software package for the application; and transmitting the software package to the UT.

According to certain aspects of the present disclosure, providing the WLAN AP services as in block 304 may include providing the WLAN AP services to a user terminal (UT), and operations 300 may include determining that a user subscription for an application on the UT is invalid and deleting a software package for the application from a storage medium of the AP, based on the determination.

In aspects of the present disclosure, downloading the system image as in block 302 may include receiving a configuration via the wireless network connection, and providing the WLAN AP services as in block 304 may include providing the WLAN AP services according to the configuration.

According to certain aspects of the present disclosure, operations 300 may include powering-up the AP and sending to the network entity a request to download the system image, as in block 302, in response to the AP powering-up.

In aspects of the present disclosure, operations 300 may include activating a radio of the AP prior to downloading the system image in block 302 and preventing a user terminal (UT) from establishing a communications session with the AP via the radio prior to providing the WLAN AP services.

Figure 4:
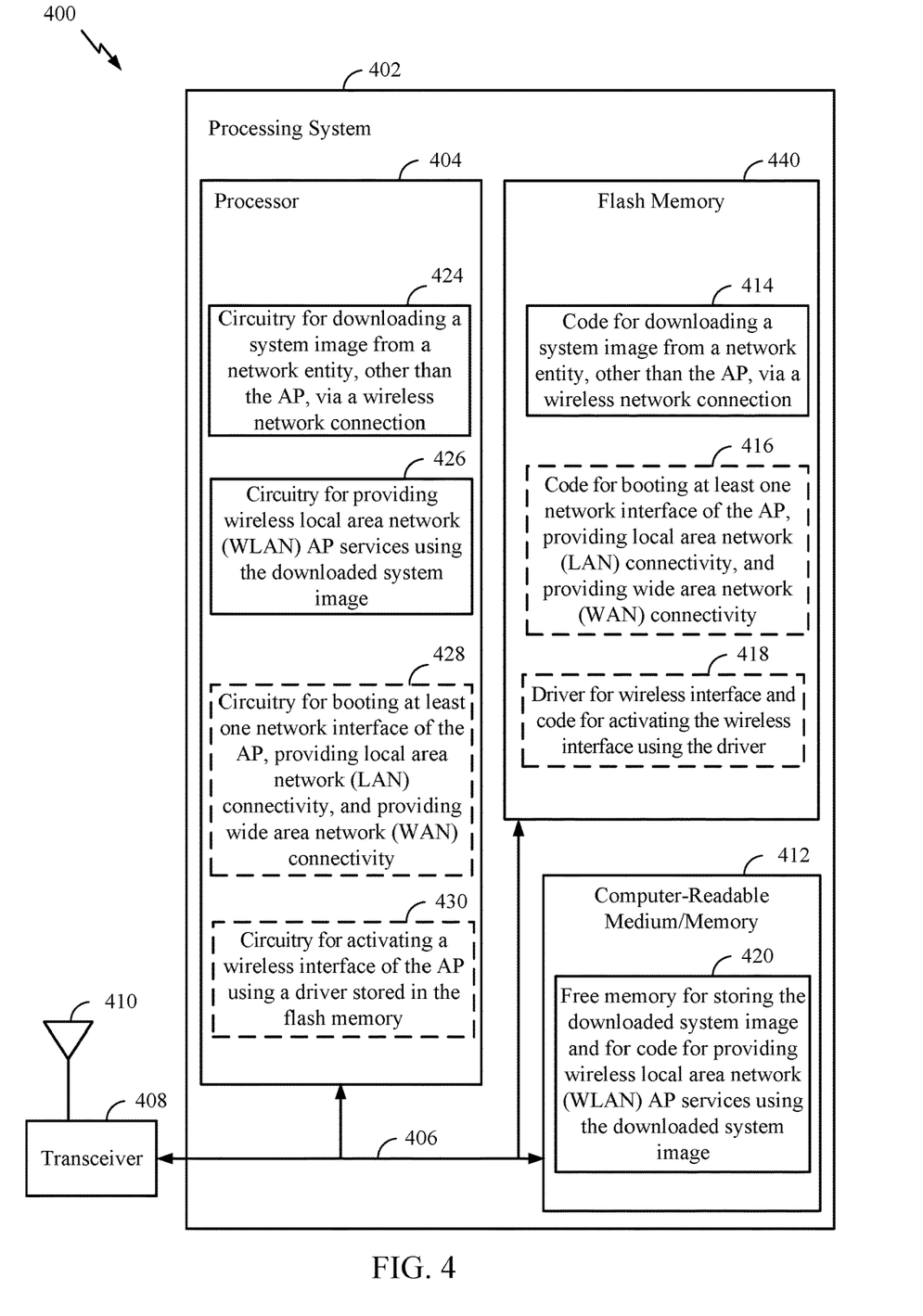
FIG. 4 illustrates a communications device that may include various components configured to perform the operations illustrated in FIG. 3, in accordance with aspects of the present disclosure.

FIG. 4 illustrates a communications device 400 that may include various components (e.g., corresponding to means-plus-function components) configured to perform operations for the techniques disclosed herein, such as the operations illustrated in FIG. 3. The communications device 400 includes a processing system 402 coupled to a transceiver 408, which may be referred to as a transmitter when transmitting signals from the device 400 and as a receiver when receiving signals at the device 400. For other aspects, the transceiver 408 may be replaced by a transmitter and a separate receiver. The transceiver 408 is configured to transmit and receive signals for the communications device 400 via an antenna 410, such as the various signals as described herein. The processing system 402 may be configured to perform processing functions for the communications device 400, including processing signals received and/or to be transmitted by the communications device 400.

The processing system 402 includes a processor 404 coupled to a computer-readable medium/memory 412 via a bus 406. In certain aspects, the computer-readable medium/memory 412 is configured to store instructions (e.g., computer-executable code) that when executed by the processor 404, cause the processor 404 or communications device 400 to perform the operations illustrated in FIG. 3, or other operations for utilizing an access point (AP) that does not use a flash memory for some storage and file system operations. In certain aspects, computer-readable medium/memory 412 has free memory 420 for storing the downloaded system image and for code for providing wireless local area network (WLAN) AP services using the downloaded system image. In certain aspects, flash memory 440 has code 414 for downloading a system image from a network entity, other than the AP, via a wireless network connection; optional code 416 for booting at least one network interface of the AP, providing local area network (LAN) connectivity, and providing wide area network (WAN) connectivity; and optional driver for wireless interface and code 418 for activating the wireless interface using the driver. In certain aspects, the processor 404 has circuitry configured to implement the code stored in the computer-readable medium/memory 412 and the flash memory 440. The processor 404 includes circuitry 424 for downloading a system image from a network entity, other than the AP, via a wireless network connection; circuitry 426 for providing wireless local area network (WLAN) AP services using the downloaded system image; optional circuitry 428 for booting at least one network interface of the AP, providing local area network (LAN) connectivity, and/or providing wide area network (WAN) connectivity; and optional circuitry 430 for activating a wireless interface of the AP using a driver stored in the flash memory.

The techniques described herein may be used for various wireless communication technologies, such as time division multiple access (TDMA), frequency division multiple access (FDMA), orthogonal frequency division multiple access (OFDMA), single-carrier frequency division multiple access (SC FDMA), time division synchronous code division multiple access (TD-SCDMA), and other networks. The terms "network" and "system" are often used interchangeably. An OFDMA network may implement a radio technology such as IEEE 802.11 (WI-FI™).

The techniques described herein may be used for the wireless networks and radio technologies mentioned above as well as other wireless networks and radio technologies. For clarity, while aspects may be described herein using terminology commonly associated with WI-FI™ wireless technologies, aspects of the present disclosure can be applied in other communication systems.

A UT may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UTs may be considered machine-type communication (MTC) devices or evolved MTC (eMTC) devices. MTC and eMTC devices include, for example, robots, drones, remote devices, sensors, meters, monitors, location tags, etc., that may communicate with an AP, another device (e.g., remote device), or some other entity. A wireless node may provide, for example, connectivity for or to a network (e.g., a wide area network such as Internet or a WI-FI™ network) via a wired or wireless communication link. Some UTs may be considered Internet-of-Things (IoT) devices.

In some examples, access to the air interface may be scheduled. A scheduling entity (e.g., an AP) allocates resources for communication among some or all devices and equipment within its service area. The scheduling entity may be responsible for scheduling, assigning, reconfiguring, and releasing resources for one or more subordinate entities. That is, for scheduled communication, subordinate entities utilize resources allocated by the scheduling entity. APs are not the only entities that may function as a scheduling entity. In some examples, a UT may function as a scheduling entity and may schedule resources for one or more subordinate entities (e.g., one or more other UTs), and the subordinate entities may utilize the resources scheduled by the UT for wireless communication. In some examples, a UT may function as a scheduling entity in a peer-to-peer (P2P) network, and/or in a mesh network. In a mesh network example, UTs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "determining" encompasses a wide variety of actions. For example, "determining" may include calculating, computing, processing, deriving, investigating, looking up (e.g., looking up in a table, a database or another data structure), ascertaining, identifying, and the like. Also, "determining" may include receiving (e.g., receiving information), accessing (e.g., accessing data in a memory), and the like. Also, "determining" may include resolving, selecting, choosing, establishing, and the like.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 3.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method for wireless communications, by an access point (AP) having a limited amount of flash memory storing instructions, the method comprising:
   executing the instructions, stored in the flash memory, to download a system image from a network entity, other than the AP, via a wireless network connection; and
   providing wireless local area network (WLAN) AP services using the downloaded system image, wherein the AP has less than 1 megabyte (MB) of total flash memory.

2. The method of claim 1, further comprising:
   powering-up the AP; and
   executing the instructions, stored in the flash memory, to boot at least one network interface of the AP, provide local area network (LAN) connectivity, and provide wide area network (WAN) connectivity, wherein executing the instructions does not provide the WLAN AP services.

3. The method of claim 1, further comprising:
   activating a wireless interface of the AP using a driver stored in the flash memory; and
   establishing the wireless network connection via the wireless interface.

4. The method of claim 1, further comprising selecting the system image from a plurality of system images, based on a country of the AP.

5. The method of claim 4, wherein selecting the system image is further based on a country code assigned to the AP.

6. The method of claim 1, wherein providing the WLAN AP services comprises providing the WLAN AP services to a user terminal (UT), and wherein the method further comprises:
   determining, based on user subscription information for an application on the UT, to download a software package for the application;
   downloading the software package for the application; and
   transmitting the software package to the UT.

7. The method of claim 1, wherein providing the WLAN AP services comprises providing the WLAN AP services to a user terminal (UT), and wherein the method further comprises:
   determining that a user subscription for an application on the UT is invalid; and
   deleting a software package for the application from a storage medium of the AP, based on the determination.

8. The method of claim 1, wherein downloading the system image comprises receiving a configuration via the wireless network connection, and wherein providing the WLAN AP services comprises providing the WLAN AP services according to the configuration.

9. The method of claim 1, further comprising:
   powering-up the AP; and
   sending to the network entity a request to download the system image in response to the AP powering-up.

10. The method of claim 1, further comprising:
    activating a radio of the AP prior to downloading the system image; and
    preventing a user terminal (UT) from establishing a communications session with the AP via the radio prior to providing the WLAN AP services.

11. An access point (AP) for wireless communications, comprising:
    one or more processors;
    flash memory coupled with the one or more processors and including first instructions to cause the one or more processors, individually or collectively, to download a system image from a network entity, other than the AP, via a wireless network connection, wherein the one or more processors, individually or collectively, are configured to:
       execute the first instructions; and
       provide wireless local area network (WLAN) AP services using the downloaded system image, wherein the AP has less than 1 megabyte (MB) of total flash memory; and
    non-flash memory coupled with the one or more processors and configured to store the downloaded system image.

12. The AP of claim 11, wherein:
    the flash memory includes second instructions to boot at least one network interface of the AP, provide local area network (LAN) connectivity, and provide wide area network (WAN) connectivity;
    the flash memory does not include third instructions to provide the WLAN AP services; and
    the one or more processors, individually or collectively, are further configured to execute the second instructions to boot the at least one network interface of the AP, provide the LAN connectivity, and provide the WAN connectivity.

13. The AP of claim 11, further comprising a wireless interface, wherein:
    the flash memory stores a driver for the wireless interface; and
    the one or more processors, individually or collectively, are further configured to:

activate the wireless interface using the driver; and
establish the wireless network connection via the wireless interface.

14. The AP of claim 11, wherein the one or more processors, individually or collectively, are further configured to select the system image from a plurality of system images, based on a country of the AP.

15. The AP of claim 11, further comprising a transmitter, wherein the one or more processors, individually or collectively, are further configured to:
provide the WLAN AP services to a user terminal (UT);
determine, based on user subscription information for an application on the UT, to download a software package for the application;
download the software package for the application; and
cause the transmitter to transmit the software package to the UT.

16. The AP of claim 11, wherein the one or more processors, individually or collectively, are further configured to:
provide the WLAN AP services to a user terminal (UT);
determine that a user subscription for an application on the UT is invalid; and
delete a software package for the application from the non-flash memory or other storage media of the AP, based on the determination.

17. The AP of claim 11, wherein the one or more processors, individually or collectively, are further configured to:
receive a configuration via the wireless network connection; and
provide the WLAN AP services according to the configuration.

18. The AP of claim 11, wherein the first instructions cause the one or more processors, individually or collectively, to download the system image from the network entity in response to the AP being powered-up.

19. The AP of claim 11, wherein:
the flash memory includes second instructions to cause the one or more processors, individually or collectively, to:
activate a wireless interface of the AP prior to downloading the system image; and
prevent a user terminal (UT) from establishing a communications session with the AP via the wireless interface prior to providing the WLAN AP services; and
the one or more processors, individually or collectively, are further configured to execute the second instructions.

* * * * *